United States Patent
Stevens et al.

(10) Patent No.: US 6,539,425 B1
(45) Date of Patent: Mar. 25, 2003

(54) POLICY-ENABLED COMMUNICATIONS NETWORKS

(75) Inventors: Mark L. Stevens, Auburndale, MA (US); Walter Johan Weiss, Chelmsford, MA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/349,272

(22) Filed: Jul. 7, 1999

(51) Int. Cl.$^7$ .............................................. G06F 13/00
(52) U.S. Cl. ...................... 709/220; 709/221; 709/222; 709/223
(58) Field of Search .................. 709/220, 221, 709/222, 223

(56) References Cited

U.S. PATENT DOCUMENTS

| | | | |
|---|---|---|---|
| 5,175,852 A | 12/1992 | Johnson et al. | 707/8 |
| 5,522,044 A | 5/1996 | Pascucci et al. | 709/222 |
| 5,581,764 A | 12/1996 | Fitzgerald et al. | 709/223 |
| 5,678,006 A | 10/1997 | Valizadeh et al. | 709/223 |
| 5,758,083 A | 5/1998 | Singh et al. | 709/223 |
| 5,777,549 A | 7/1998 | Arrowsmith et al. | 340/506 |
| 5,809,507 A | 9/1998 | Cavanaugh | 707/103 R |
| 5,815,710 A | 9/1998 | Martin et al. | 709/316 |
| 5,832,529 A | 11/1998 | Wollrath et al. | 707/206 |
| 5,848,419 A | 12/1998 | Hapner et al. | 707/103 R |
| 5,872,928 A * | 2/1999 | Lewis et al. | 709/222 |
| 5,889,953 A * | 3/1999 | Thebaut et al. | 709/221 |
| 5,893,118 A | 4/1999 | Sonderegger | 707/203 |
| 6,047,322 A * | 4/2000 | Vaid et al. | 709/224 |
| 6,167,445 A * | 12/2000 | Gai et al. | 709/223 |
| 6,243,747 B1 * | 6/2001 | Lewis et al. | 709/220 |
| 6,345,294 B1 * | 2/2002 | O'Toole et al. | 709/222 |
| 6,381,639 B1 * | 4/2002 | Thebaut et al. | 709/222 |

OTHER PUBLICATIONS

K. Heiler et al.; Policy Driven Configuration Management of Network Devices; IEEE Network Operations and Management Symposium; vol. 1, pp. 674–689; Apr. 1996.*

J.P. Redlich, et al, "Distributed Object Technology for Networking, " IEEE Communications Magazine, Oct., 1998, pp. 100–111.

C. Feltman, "On the Horizon: DEN and Policy–Based Networks," Business Communications Review, Dec. 1998, pp. 44–46.

B. Bellman, "Adding Smarts to the Network Cloud," Business Communications Review, Dec. 1998, pp. 39–43.

"Intelligent Management with the Redcape Policy Framework," RedCape Policy Software, Inc., 1998.

* cited by examiner

Primary Examiner—Kenneth R. Coulter
(74) Attorney, Agent, or Firm—Ryan, Mason & Lewis, LLP

(57) ABSTRACT

Simple and complex policy mechanisms for policy-enabled advantageously comprise a Data Access Client Module (DACM) and Policy Interpreter and Processor (PIP) for establishing data paths between a network device and data stores containing device configuration information, and simple policy definitions, e.g., filter tables, and complex policy expressions. A uniform distributed data model provides device state information and policy information to be efficiently retrieved from virtually all network devices rather than solely from directory server(s). Using a registration and notification system, data elements (e.g., directory subtrees or executable modules) are associated with a particular owner network device and other network devices requiring access to data elements to derive needed state information for taking network policy actions. A data element is provided via messages sent to a target network device upon the occurrence of a relevant event (e.g., exceeding a prescribed bandwidth allocation or congestion level).

44 Claims, 6 Drawing Sheets

POLICY-ENABLED COMMUNICATIONS NETWORKS

FIELD OF THE INVENTION

The present invention relates generally to the field of communications networks. More particularly, the present invention relates, in one aspect, to controlling the operation of such networks pursuant to one or more network operational policies. Still more particularly, aspects of the present invention relate to networks including policy-enabled devices, such as routers, switches and the like, that are responsive to distributed policy messages for device configuration and operation.

BACKGROUND OF THE INVENTION

Modern communications networks, including private and public data networks (such as Wide Area Networks, and the Internet) comprise a (usually large) number of interconnected network nodes. These nodes each contain one or more of a variety of network devices—such as repeaters, concentrators, routers, bridges, switches and hubs—for relaying, combining, directing and otherwise handling information in its transit across the network. Each device has traditionally been configured and controlled for its intended function under the control of a human network administrator using table-driven configuration and control information. The device settings for a particular mode of operation generally depend on the type of device, and usually vary for devices of the same type when supplied by different manufacturers.

While some network nodes, and devices at such nodes, remain in one configuration and operational state for some time, others require reconfiguration frequently to reflect changing network conditions and operational preferences. Thus, for example, if traffic arriving at a particular node increases, or priorities for particular data streams through a node change, it may be necessary to adjust (configuration, filter or other) table settings at one or more network nodes. Frequently, configuration and other settings are dictated, in part, by Quality of Service (QoS) commitments made to particular users or classes of users. Other configuration changes are required to reflect network service changes, as when new or modified network applications are introduced.

To avoid the tedious and error-prone manual adjustment of configuration settings at network nodes, a number of network management tools have been developed. These tools have generally allowed centralized administration of a plurality of nodes through the sending of messages to replace or update routing and other tables at affected nodes.

More recently, a directory-based approach has been used to effect changes at nodes in some networks. In accordance with one implementation of directory-based controls, a directory server transmits information in a directory to a network node to be updated, often using the well-known Lightweight Directory Access Protocol (LDAP) adopted as a standard by the Internet Engineering Task Force (IETF). Directory contents received at the node are used to wholly or partially replace or update configuration and related operational information previously stored at the node. The same directory information may be used for updating more than one node (or all nodes) in a network. Directory information used for such updating has traditionally been supplied by a network administrator, as have the directories applicable to particular nodes and particular circumstances (such as changes of QoS or user priorities).

With the increasing diversity of network users, applications and available services, networks of even modest complexity have given rise to the need for unified policy-based control and configuration. Attempts have been made to introduce policy servers suitable for formulating directory information appropriate for delivery to network devices for effecting the policies reflected in the directory contents. In accordance with a current "pull" model, directory information is sought to be provided in response to a request by a network device upon device boot-up, or upon some change in operation of a device or network application. Such proposed pull methodology is to be contrasted with prior "push" approaches in which a central repository delivered (pushed) policy-based data to network devices.

FIG. 1 shows a simple prior art arrangement for delivery of a desired network policy to a network device using policy-based administration. There, a network manager establishes a policy for all or parts of a network using policy development tools, typically including a high level language and network and device definitions. The policy definition, including such QoS, authentication, encryption or other policy factors deemed important, is conveniently stored at a directory server, shown as 120 in FIG. 1, where it becomes accessible using LDAP. When a network device, such as 130 in FIG. 1, is booted up or receives a request by a user for some new or different service, device 130 issues a request for directions to a policy server, shown as 110 in FIG. 1. The policy server in turn issues a request of the directory server 120 for the information in the appropriate directory. Policy server 110 in typical fashion then forwards a copy of the requested directory information to the network device 130, often using simpler protocols—such as the Common Open Policy Service (COPS) protocol. Other well-known protocols commonly used for dealing with information transfers between network devices and a policy server include the Remote Authentication Dial-In User Service (RADIUS), and its extension, DIAMETER.

While the policy server 120 in FIG. 1 is used to control policy behavior (relating, e.g., to security or QoS) of a network device such as 130 in FIG. 1, the policy server is not generally responsible for providing configuration information for individual network devices. Rather, such device configuration information is typically requested directly from the directory server ( 120 in FIG. 1) by each particular device. Again, access to directory information is facilitated using protocols such as the LDAP protocol.

FIG. 2 shows another representation of a prior art policy-based network control arrangement with two network devices 130-1 and 130-2 connected directly to directory server 120 over LDAP links 240 and 260 for the transfer of device configuration information. These network devices are also shown connected through policy server 110 to directory server 120. Illustratively, the connection 250 between policy server 110 and directory server 120 is also a LDAP link, while the policy-based information is transferred to representative network devices 130-1 and 130-2 over respective links 270-1 and 270-2—illustratively using the above-mentioned COPS protocol (for device 130-1) and the well-known DIAMETER protocol (for device 130-2). The data store 125 providing the directory storage facilities is also shown explicitly in the FIG. 2 network representation.

One policy-based approach to network administration, known as Directory Enabled Networks (DEN), has sought to define and relate problem domains, usage profiles, an information model and so-called "schemas" for integrating networks with directory services. Schemas are often defined in terms of classes of objects, each subject to inheritance, naming and other constraints, and each having identifiable attributes. For an example of a policy schema and illustrative class structures, see "Policy Framework Core Information Model," by the Internet Engineering Task Force, Nov. 17, 1998, available at search.ietf.org/internet-drafts/draft-ietf-policy-core-schema-00.txt.

An important factor in the use of a DEN or other prior policy-based network control is the adherence to the strict definitions, directory organization and language by the diverse vendors of network devices. Such vendors have traditionally sought to differentiate their product and service offerings from those of competitors by including proprietary features and extensions to industry standards. Thus, particular expressions of policy can be interpreted differently by network devices incorporating such proprietary extensions and features, thereby making uniform policy enforcement difficult or impossible.

Though arrangements like those shown in FIGS. 1 and 2 prove useful for many applications, they rely, ultimately, on tabular (or similarly structured) data stored in network devices for ready access upon arrival of data packets, cells or other input flows bearing associated characterizing (e.g., header) information. Thus, for example, a pattern match between particular packets, or classes of packets, causes prescribed actions (e.g., drop, delay, or an application of relative priority) by the network device. Such simple policies as allocating a prescribed bandwidth to packets of a particular class lend themselves to such table-driven policy prescription. Conditions based on awareness of local time can likewise be fairly simply accommodated. With more complex policies, however, and with a wide diversity of network devices (or even software releases for the same device), policy implementation becomes quite unwieldy or impossible using such static, table-driven techniques.

In another aspect, existing and proposed network policy paradigms place the policy decision point for implementing policy in a single, usually fixed, location. In particular, traditional SNMP models and the emerging LDAP model affix the decision point within network devices. For example, a network management application illustratively pushes a filter table into a network device (SNMP), or a network device pulls a filter table from a directory server (LDAP) as shown in FIGS. 1 and 2. In either case, the network device then consults the received filter table as it examines each packet that it handles. Using a policy server model employing RADIUS, DIAMETER, or COPS, moves the decision point out of the network device, but still provides for little flexibility. Optimizing policy implementation by selectively positioning the decision point is restricted by all of the current architectural models. As will be apparent to those skilled in the art, such optimization can be especially critical in implementing complex policies.

Complex policies generally reflect higher-level business goals. For example, to maximize the use of network resources, an enterprise may choose to disable local video traffic when local voice traffic requires more network resources. To implement such a policy, a network device must evaluate information not found in tables received using any protocol. The condition implies real-time analysis of bandwidth utilization and distribution.

It is often desirable to deploy complex policies in a variety of networks, including Wide Area Networks (WANs) interconnecting distributed locations of a corporation or other organization. Thus, for example, to ensure that mission-critical processes are not delayed in times of heavy traffic, an organization with offices in multiple cities may enable alternate routes, e.g., between its Chicago and St. Louis offices, when utilization of its primary link exceeds a threshold, such as 80%. In other cases, an organization seeking to balance Internet access may design a policy to limit a particular department's outbound web traffic to 20% of the total bandwidth available. Similarly, to limit the interruption of voice services, network administrators may want devices to rebalance traffic isolation parameters when the voice traffic class exceeds 95% of allocated capacity. Each of these policies requires analysis of variables external to the packets affected by the policy. A simple table specifying a simple true/false expression and an action command cannot accommodate the expression of complex policies that dictate a procedural decision process.

Network devices capable of implementing complex policies desirably base decisions on a variety of external data sources. Such data sources for complex policies may include, but are not limited to, sources such as accounting and billing servers, name servers, external directory servers, centralized policy servers, and peer devices executing coordinated policy applications. A typical example of such a network device implementing a complex policy is a wide-area network (WAN) access switch communicating with a billing server before making a policy decision. Such policy implementation is not available using present directory-based policy implementation techniques. Further, table-based policy implementation at a particular node does not permit such real time observations as use of bandwidth consumption or congestion delay (among many others) to effectively adapt operation at the particular network node or other network nodes with which it is interacting. Delays inherent in deriving and propagating table-based policies simply do not permit the application of optimum network operation policies.

SUMMARY OF THE INVENTION

Limitations of the prior art are overcome and a technical advance is made in accordance with the present invention described in illustrative embodiments herein.

In one illustrative embodiment of the present invention, both simple and complex policy mechanisms are included in a new architecture for policy-enabled devices. Such policy-enabled devices advantageously contain a Data Access Client Module (DACM) and Policy Interpreter and Processor (PIP). The DACM illustratively establishes a data path between a network device and data stores containing device configuration information, and simple policy definitions, e.g., filter tables, and the like. A policy server comprising a DACM advantageously establishes a data path to a data store, as do DACMs at individual network devices. This policy server employs the data store for storing policy server configuration information, as well as more complex policy expressions, illustratively in a directory structure.

In accordance with other illustrative embodiments of the present invention, a distributed data model is presented which allows policy information to be efficiently retrieved not only from a centralized (usually replicated) directory server, but also from virtually all network devices. Using a data element registration system, data elements (including, in appropriate cases, directory-structured and other data, and executable modules) are associated with a particular owner network device and other network devices or applications requiring access to data elements to derive policy information and execute policy applications. Access is advantageously granted (e.g. a data element is delivered) by messages sent to the target associated network device, after the occurrence of some event (such as exceeding a prescribed bandwidth allocation or congestion level).

In an illustrative distributed-policy-enabled network of devices (e.g., data servers, routers, switches and the like) in accordance with an embodiment of the present invention, policy is imposed and modified by one or more policy applications executing in one or more network devices. Each of these network devices receives and sends data elements while presenting a standard, device-independent data structure to target external devices. Each network device accommodates the particulars of its internal infrastructure using a well-known schema, such as the core schema published by the DMTF and IETF standards organizations.

BRIEF DESCRIPTION OF THE DRAWING

The above-summarized description of illustrative embodiments of the present invention will be more fully understood upon a consideration of the following detailed description and the attached drawing, wherein.

DETAILED DESCRIPTION
Illustrative System Overview

Figure 1:
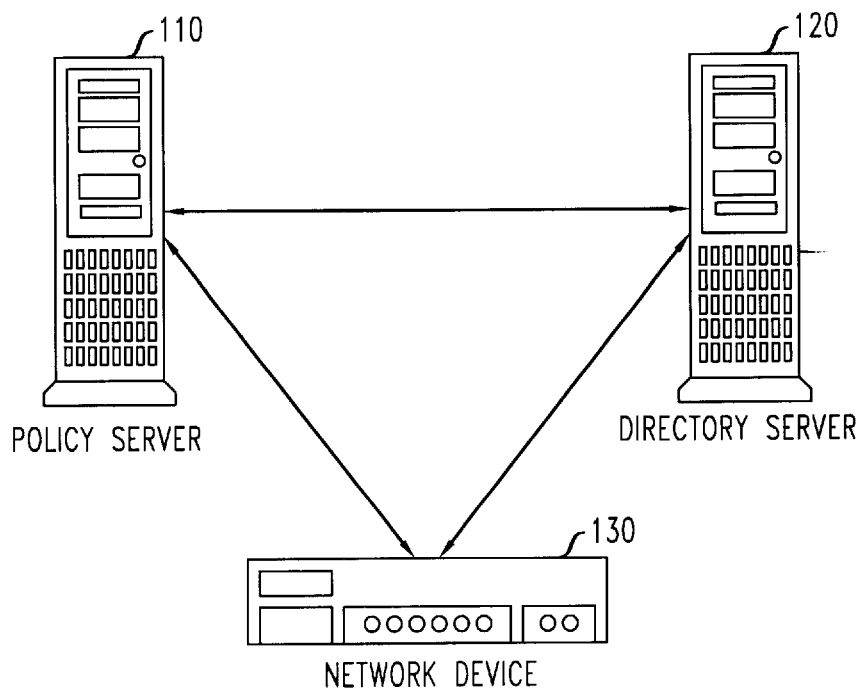
FIG. 1 shows a prior art policy-based network control arrangement.
Figure 2:
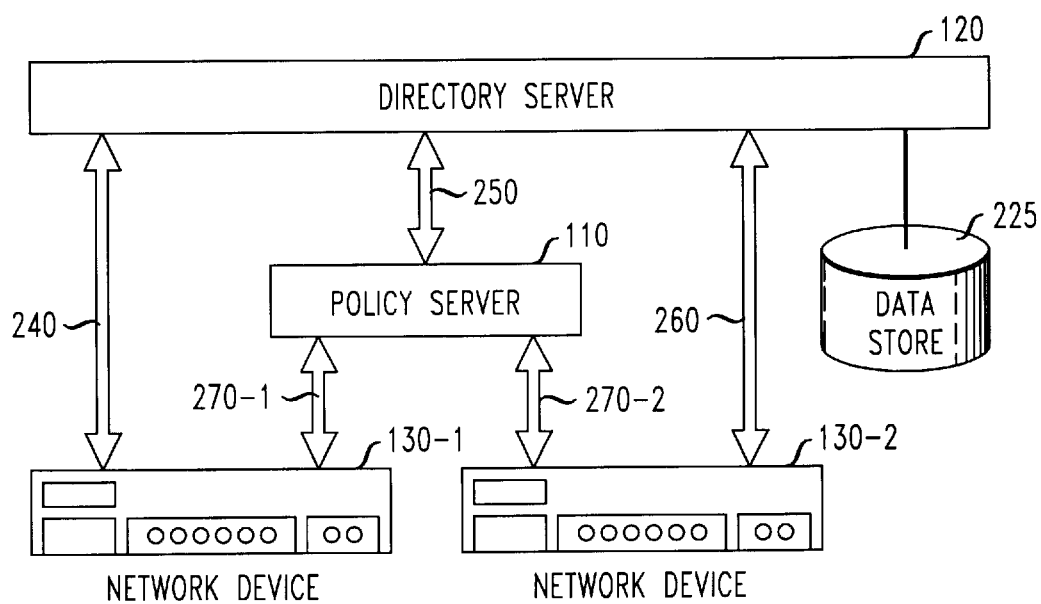
FIG. 2 is an alternative view of a network based on the prior art network of FIG. 1, but including two network devices receiving directory information using a variety of protocols.
Figure 3:
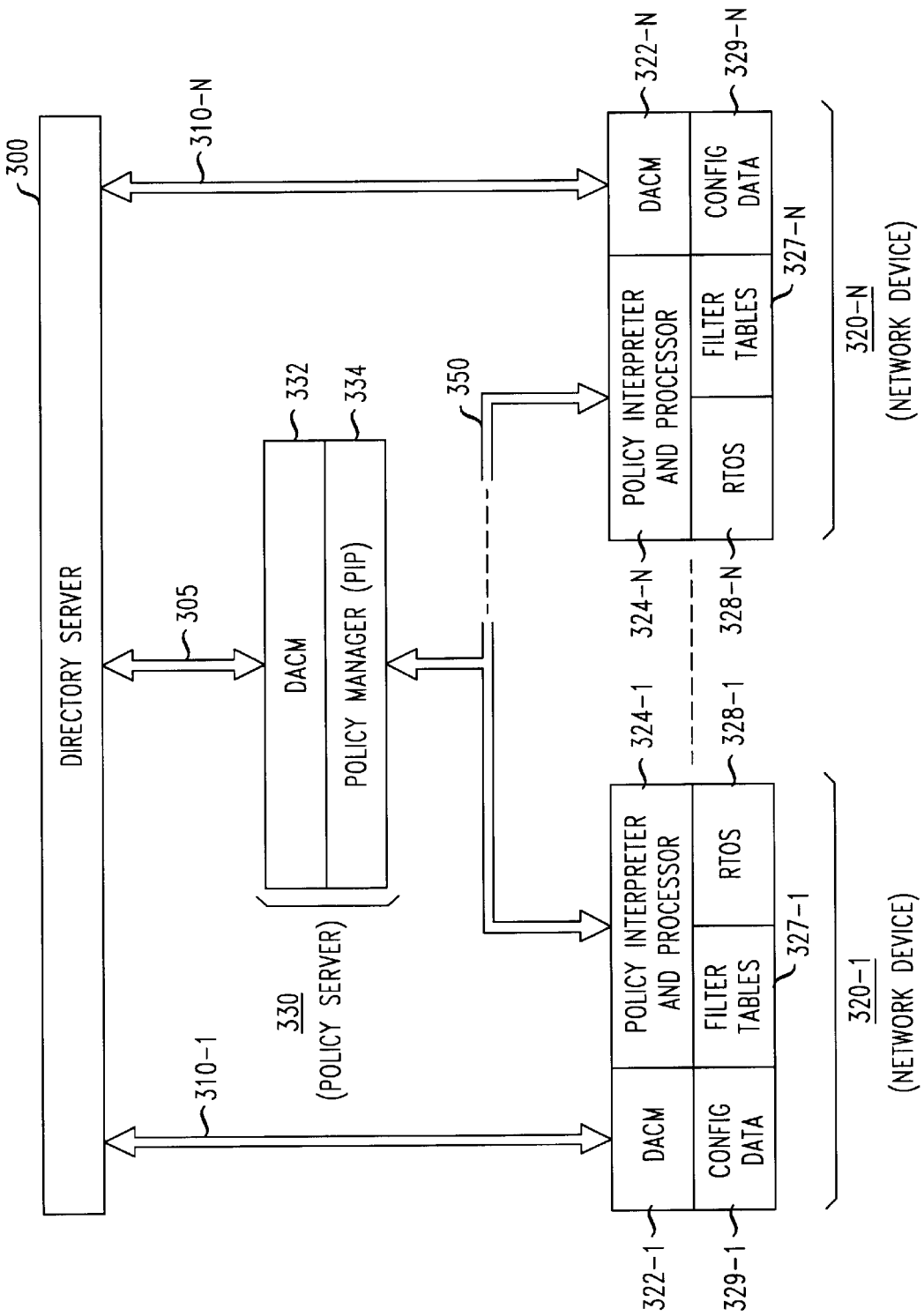
FIG. 3 is an overall view of a network comprising an illustrative embodiment of the present invention.

FIG. 3 shows an illustrative embodiment of the present invention in a network comprising a directory server 300 connected to a plurality, N, of network devices 320-i via respective data links 310-i, i=1, 2, . . . , N. Directory server 300 is also connected via link 305 to policy server 330, the latter comprising policy manager (PIP) 334 and data access client module (DACM) 332. Each network device 320 illustratively comprises a DACM 322-i, policy interpreter and processor 324-i, real-time operating system 328-i, configuration data table 329-i and filter tables 327-i.

Of course each of the elements 300, 320-i and 330 will typically include other functional elements not explicitly shown in FIG. 3 for performing functions typical of such elements. For example, directory server 300 will typically include a directory-structured memory system operating under the control of a processor, as is presently well known. Devices 320-i will include functionality associated with the particular type of device; when device 320-i is a router, for example, normal input/output facilities will be provided, as will means for examining address and other control information in packet headers and the like. (Filter tables 327-i will be used in appropriate cases in cooperation with such means for examining headers and for other known purposes.) Since network devices 320-i will assume many particular forms and functions, and may be the product of different manufacturers or models of the same manufacturer, the real-time operating systems 328-i in each device will, in general, vary one from the other. Similarly, configuration data 329-i (stored in tables or other convenient form) will, in general, be different for different devices.

Implementing and Managing Simple Policies

In operation, the network represented in FIG. 3 provides for the delivery of device configuration data and other simple policy information, such as filter table data stored in filter tables 327-i, via links 310-i. These links will illustratively operate in accordance with the LDAP protocol in response to queries originating at network devices 320-i. Generally, these requests will be generated by network devices at bootup or when conditions arise at the device requiring modified configuration or operation information.

Delivery of policy information (for simple or complex policies) is advantageously communicated from directory servers to network devices (or policy servers) in the form of messages consistent with the protocol used. While many implementations of existing protocols and extensions thereof by particular vendors include proprietary features and associated message content, another aspect of the present invention provides a dynamic protocol message interpreter that can be tailored to a particular dialect or set of extensions to an otherwise standard protocol. Moreover, the illustrative protocol interpreter can be updated as additional or different changes and extensions are made to the standard protocol.

Figure 4A:
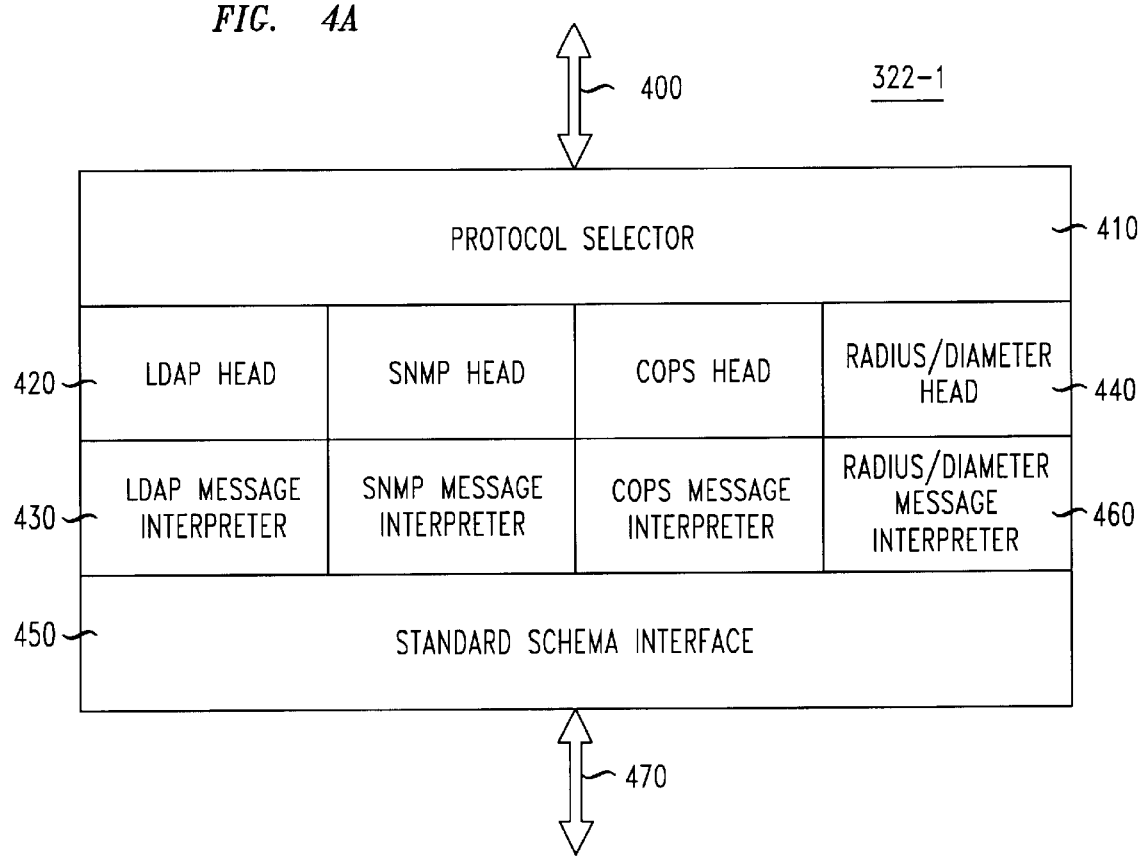
FIG. 4A shows an illustrative organization of a DACM used in the embodiment of FIG. 3.

FIG. 4A is a representation of an illustrative dynamic protocol interpreter in accordance with an illustrative embodiment of the present invention. There, input messages to and from an illustrative DACM, the whole styled 322 to correspond to one of the DACM elements in network devices shown in FIG. 3. The DACM is further shown as comprising a protocol selector 410 for recognizing the particular protocol used on the link 400. Selector 410 directs received messages through protocol header processors, such as LDAP head 420 for LDAP protocol messages and RADIUS/DIAMETER head 440 for messages used in the RADIUS/DIAMETER protocol. Similar (unnumbered) header processors are indicated in FIG. 4A by the designation SNMP head for the SNMP protocol, and by COPS head for processing of COPS message headers to extract message length and other standard protocol features. Other particular protocols are processed in the same manner as illustrated in FIG. 4A. It will sometimes prove advantageous to have message headers include protocol dialect or version identification, where permitted by the constraints of the protocol.

Messages in each of the illustrative protocols are then interpreted by corresponding message interpreters (e.g., 430 and 460 for LDAP and RADIUS/DIAMETER messages, respectively). Importantly, each of the protocol message interpreters (as aided by any version or dialect information extracted by the associated header processor) is adapted to include means for interpreting variations, extensions or version-specific elements or characteristics. Use of an interpreter in this manner allows adaptation to messages consistent with particular protocol versions, variations or extensions. The output of a currently active protocol message interpreter is then presented to an Applications Program Interface (API) or other interface for a standard schema. Again, the adaptability of the protocol message interpreters allows use of a variety of protocol message variants, while retaining a constant schema. Since a schema is an abstraction of a real world entity, such as a network or a portion thereof, e.g., a device in a network, it provides the basis for translating control information received using downloads from directory or other data sources, as illustrated in FIGS. 3 and 4A. Thus, when the interpreted message contents (commands and data, for example) are applied to the schema interface, information is extracted in standardized ways for populating or changing configuration data or table-defined policies. One schema that finds application in a variety of network contexts is the Core Schema developed by the Desktop Management Task Force (DMTF) and described, e.g., in core specification documents available on the World Wide Web (WWW) at dmtf.org/spec/cims.html. Other related documents are also available at the last-cited URL, and a tutorial of the DMTF Common Information Model (CIM) is presented at dmtf.org/spec/cim_tutorial/. The DMTF model also provides for extensions that will find application, in network contexts employing the present inventive teachings. The Internet Engineering Task Force has recently issued a further presentation of the CIM core model in Policy Framework Core Information Model draft-ietf-policy-core-schema-03.txt May 17, 1999, available at search.ietf.org/internet-drafts/draft-ietf-policy-core-schema-03.txt.

As will be clear to those skilled in the networking arts, a conventional approach to implementation of a DACM typically leads to hardware/software modules that are standards-aware at their external interfaces, but proprietary at their internal interfaces. Triggered by other modules internal to the network device, a conventional module retrieves data, translates and stores it to the device's internal data structures. To simplify the DACM and improve its reusability, in accordance with another aspect of the present invention, an internal programming interface based upon standardized directory schemas is used to advantage. Thus, the Standard Schema API module shown as 450 in FIG. 4A presents an interface that duplicates the device-specific data structures (including directory data structures) found in an external data store, e.g., 300 in FIG. 3. As a result, the internal data structures and access methods mirror those found in the external directory. Modules below the Standard Schema API module access data elements directly, but modules running above it access data elements as any data client would. A significant role of the DACM thus is one of synchronization. The DACM advantageously employs a bi-directional triggering mechanism to insure that the local directory structure remains synchronized with the external directory structure should either change. This approach simplifies the design of the DACM and contributes to the reusability of the DACM. Since the interfaces on both ends of the DACM are standardized it becomes easier to reuse the module in other network devices.

In addition to facilitating reuse of the DACM, an internal API that mirrors the data structure and access methods of the external directory makes possible policy applications that can run in a variety of network devices. Historically, applications that are intended to control specialized devices are required to have special knowledge of the device. In the architecture of FIGS. 3–5, policy applications that are aware of industry-standard data structures, including the DMTF CIM structures, can run in any network device that supports the appropriate device-specific industry-standard. The resulting environment allows the extension of a write-once, run-anywhere one level closer to the machine layer than has been used heretofore.

In accordance with one aspect of the above-described embodiments of the present invention, the described DACM organization and operation enable network devices to access directories and other data in external data stores through the use of an embedded DACM. The DACM is advantageously made responsible for retrieving both configuration and policy-related information from the data store. In other particular cases, the DACM does not make direct access to the configuration and filter structures of the network device, but relies on results of executing modules downloaded from a network server or other network device using a distributed network data model, as will be described more fully below.

Implementing and Managing Complex Policies

Standard directory schemas and use of a standard protocol such as LDAP are not lone sufficient to implement complex policy support for most network applications. Accordingly, it proves advantageous in accordance with other aspects of embodiments of the present invention to employ (as network applications may require) network elements such as Policy Servers, Bandwidth Brokers and Java Applet Servers able to support complex policies. Existing Policy Servers and Bandwidth Brokers typically support SNMP, COPS, RADIUS and DIAMETER and will continue to prove useful for some applications. But these existing approaches lack a flexible infrastructure based on enabling policy application modules downloaded to, and executed in, devices throughout the network.

The well-known Java programming language is known to provide a transportable grammar for expressing procedural policies. The Java language is described, for example, in Arnold, K. and J. Gosling, *The Java Programming Language,* Second Ed., Addison-Wesley, 1997. With the development of a standardized network environment just above the machine layer in accordance with the present inventive teachings, the number and variety of software interfaces to devices is substantially reduced. Such standardized software interfaces to device permits a language such as Java to function as a universal networking language.

Of course the Java language itself lacks an understanding of the details of a network device. No inherent definition of an IP address or a route or protocol exists in native Java usage. However, a useful result of schema definition, e.g., one developed using the CIM specification, is that each schema attribute has a well-defined name and is represented in an object-oriented hierarchy. Therefore, schemas that standardize the characteristics of a device can, in accordance with present teachings, also create an API from which Java applets manipulate the device.

Presenting a standardized interface internal to a network device advantageously extends the concept of program code portability. This characteristic is further exploited in accordance with the present inventive teachings by using a widely portable programming language such as Java. With a Java interpreter operating at a network device, applets for implementing policies are readily developed and deployed. Moreover, since the device presents a fully standardized environment, policy applets can be executed universally. If a device supports a particular industry-standard schema, it will also accept and execute a policy applet that is aware of that schema.

In typical practice the DMTF/IETF schema (and associated CIM data model) will be implemented for each affected network device in accordance with the DMTF/IETF teachings. An important departure from prior applications of the standard DMTF/IETF (or other standard) schema is that the schema is advantageously implemented at each individual network device to be affected by network policies, rather than at an external database or other central server. Such locations of the standard schema enables network policy makers to write policy application programs that use the schema to manage the enhanced network devices. Implementation of the standard schema at affected network devices precludes the need for the great number of protocols and great variety of software currently used to effect policy management. The location of a standardized schema inside individual policy-affected network devices allows policy applets to be applied to a standard API and be readily interpreted at the affected devices, thereby greatly avoiding complex and varied programs tailored to the input/output (and other) characteristics of particular devices.

Complex policies, those not readily imposed by the transfer of updated configuration data and other table-based data to individual network devices, are advantageously effected (in accordance with present inventive teachings) using program-based techniques in the network of FIG. 3. Thus, in addition to (or as may be appropriate for some cases, instead of) modifying the configuration and operation of a network device merely by transferring directory-based or other control information to the device, the arrangement of FIG. 3 advantageously employs the transfer of executable modules to the individual network devices. This transfer is illustratively provided from the policy manager 334 in policy server 330 over links 350 to PIP 324-i in respective network devices 320-i. The executable modules are then executed at network devices 320-i to adapt the network devices to perform in accordance with a complex policy propagated from network policy makers. The direction by the policy makers is reflected in the executable code delivered via PIP 334 in policy server 330. The results of execution of the received modules in combination with configuration and simple policy data (if any) received from directory server 300 permits a wide range of functionalities to be implemented in the individual network devices 320-i-based on decisions made at these network devices.

Figure 4B:
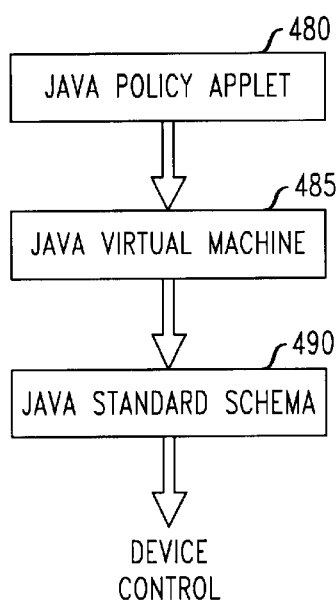
FIG. 4B illustrates the use of Java policy applets in effecting complex policies in the operation of the embodiment of FIG. 3.
Figure 5:
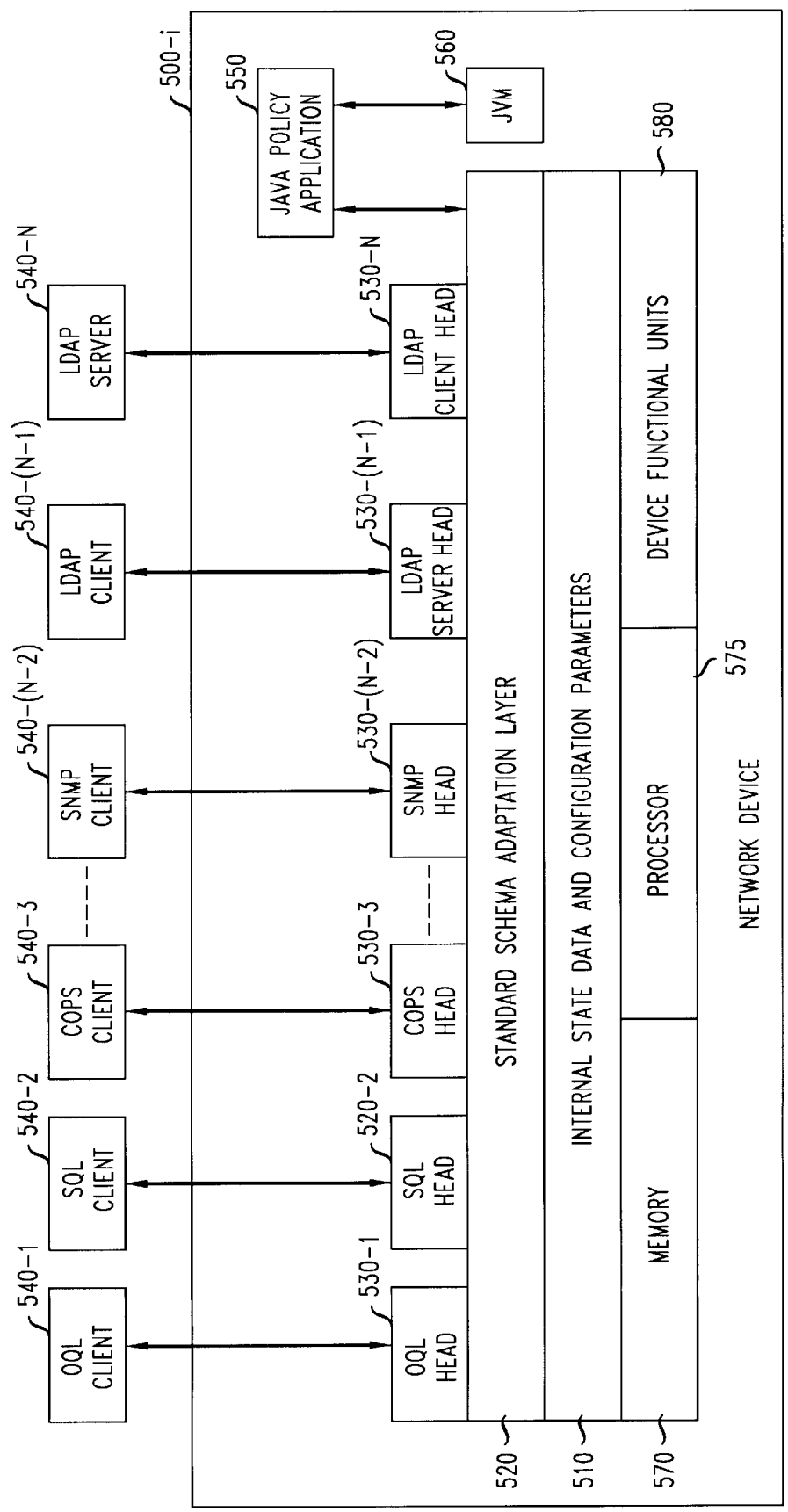
FIG. 5 shows an overall view of a network device showing the combination of elements of FIGS. 4A and 4B, including a representative plurality of head modules cooperating with respective distributed remote clients, as well as a representative client cooperating with a representative remote information server.

FIG. 4B shows an illustrative embodiment of a Policy Interpreter and Processer (PIP) of the type shown previously in FIG. 3. Again, the illustrative embodiment employs a standard schema, such as the DMTF/IETF Core Schema cited above, for effecting the operational controls needed to implement a desired policy. Messages used to implement complex strategies advantageously comprise executable modules, such as so-called "applets" in a standard language-illustratively, the Java language. FIG. 4B shows policy applets 480 received from an external source, such as policy manager 334 in FIG. 3 and forwarded to a Java virtual machine (JVM) 485. The Java virtual machine is well known in the art, as described, e.g., in Gosling, J., B. Joy, and G. Steele, *The Java Language Specification,* Addison-Wesley, 1996; Lindholm, T. Yellin, F., *The Java Virtual Machine Specification,* Addison-Wesley, 1996; and A. Taivalsaari, *Implementing a Java™ Virtual Machine in the Java Programming Language,* Sun Technical Report TR-98-64, available at sunlabs.com/technical-reports/1998/smli_tr-98-64.pdf. The Java virtual machine is supplied for various hardware/software platforms as part of the Java Development Kit (JDK), available from Sun Microsystems at sun.com/ and elsewhere. As used in this detailed description, a Java applet is a module of Java bytecodes prepared for execution in a runtime environment including a Java virtual Machine (JVM). It will be understood, however, that other particular executable modules may be used as circumstances may suggest or require.

When the received Java applets are interpreted by JVM 485, the interpreted applets manipulate the operational characteristics of the device by changing values stored in the standard schema-such as the DMTF/IETF Core Schema and its associated DMTF CIM data model. Appropriate application of such a data model for use in many network contexts will be described further below. The processing of Java applets and application to the standard schema as shown in FIG. 4B generates the control information and logic appropriate to make any necessary configuration or operational adjustments of the target network device. Different particular applets may, in some cases, be sent to different types of network devices, but the use of a uniform data structure operating through standard interfaces overcomes many prior portability limitations. This advantage obtains because the use of standardized data structures and a standardized API at each affected network device causes such network devices to present rm appearance to network applications. This uniformity and its attendant advantages will appear further in the descriptions of FIGS. 5–7 below.

FIG. 5 illustrates a representative network device 500-i having the combined functionality of the network device elements shown in FIGS. 4A and 4B as extended in the following discussion. FIG. 5 will be used to further illustrate the use of a standard schema receiving configuration and other network application information from a variety of sources and will provide a basis for elaborating aspects of a distributed application and distributed data structure in accordance with illustrative embodiments of the present invention.

Based on the preceding discussion of FIGS. 4A and 4B, those skilled in the art will recognize the plurality of external data clients and servers 540 j, j=1, 2, . . . , N with which network device 500-i is in messaging communication through respective header processors 530-j. In addition-to clients described in connection with FIGS. 1–3, 4A and 4B, illustrative Object Query Language (see obmg.org) and well-known Structured Query Language (SQL) clients are shown in FIG. 5. Special note should be taken of the existence of both an illustrative external LDAP client 540-(N−1) and illustrative LDAP server 540-N. While other external client/server pairs 540-j (with associated internal header processors 530-j) for other particular communications protocols will in general be used in network devices 500-i, use of the LDAP pair simplifies the following discussion. Information exchanged between external clients/servers 540-j and network device 500-i is advantageously processed in the schema adaptation layer 520 in device 500-i.

Schema adaptation layer 520 is arranged to present a standard Applications Program Interface (API)-such as that for the illustrative CIM core schema noted above—to all external devices. Thus, external clients/servers 540-j each interact with policy-enabled network devices of the type shown in FIG. 5 in a uniform, predictable manner. However, while such individual network devices each present a uniform schema API to external devices, different network devices are adapted by the schema adaptation layer to interact with the underlying hardware and system software in a manner suitable to such underlying infrastructure. So, for example, standard schema adaptation layer 520 will, in accordance with the published teachings of the illustrative CIM core schema, adapt configuration and other control information entering and exiting the schema layer to the requirements of external devices such as 540-j, and to the underlying infrastructure of the network device. This underlying infrastructure is represented in FIG. 5 by the internal state data and configuration parameters (510) for device 500-i as well as memory 570 and other device functional units, such as ports, program logic, switching meshes, buffer controls and other well-known network device elements. Processor 575 represents necessary processing capabilities to carry out program execution, monitoring and other device functions not otherwise provided for in functional units 580 or otherwise in network device 500-i. In appropriate cases processor 575 will include all or a portion of a hardware Java processor. Configuration and state information associated with higher-level services often provided by network devices are also advantageously represented by standard schema. Industry standard services like RSVP, BGP, RIP, RIP 2, Virtual Private Networks, DHCP, DNS, Post Office Protocol and others are also advantageously represented in standard schemas. Java applications aware of these schemas, then manipulate operational characteristics of such services. As a result, hybrid services can be constructed from these basic services. Resulting hybrid services may include Java applications that implement policies by reading state information and manipulating the configuration information in the standard schema.

Also shown in FIG. 5 is block 550 representing a policy application, typically including at least some Java (or other language) network policy application. Such policy application will be available for updating or augmentation by policy applets (or other executables) received from external sources such as via LDAP server 540-N and LDAP client processor 530-N, and forwarded to policy application 550 via standard schema adaptation layer 520. Any such received executables will be executable using an execution engine, such as the illustrative Java Virtual Machine 560 shown in FIG. 5. Advantageously, policy application 550 has access to internal state data and configuration parameters represented by block 510 in FIG. 5. Any network application 550 running at network device 500-i may, of course, merely be a portion of a larger application distributed between or among a plurality of network devices.

As will be further appreciated from later descriptions of illustrative embodiments of the present invention, use of an illustrative LDAP server at each network device 500-i permits external sources to query network device 500-i to obtain information (and executables) present there. As one example, an external network device, say 500-k, having an LDAP client, such as 540-(N−1) may inquire as to the state of certain state data present at network device 500-i, and, pursuant to a network policy application network device 500-k may undergo reconfiguration or other actions in response to state data received from network device 500-i. The network application may be running, at least in part, at network device 500-k. As will be discussed below, a query such as that described as being issued by device 500-k will advantageously be prompted by a notification sent by network device 500-i arising from some event that device 500-i becomes aware of.

The advantages of employing a standard schema API at each network device to be policy-enabled in accordance with present inventive teachings will be clear to those skilled in the art. It will be clear, for example, that the need for tailoring configuration and other control information (and executables) to each particular network device to be controlled in accordance with a network policy can be avoided. It also proves advantageous to have executables, such as those in illustrative policy application 550, employ input and output paths through the same standard schema API in the adaptation layer 520 as do external executable applications (or portions of applications). This is, of course, the same API through which external data (including directory data, as appropriate) will normally pass in communications between network device 500-i and external devices.

In appropriate cases, it may prove advantageous to employ other policy messaging facilities for communications between network devices. For example, a simple data messaging link may be used between two or more network devices for purposes of signaling the happening of some event at one of the devices, such as reaching a threshold condition at a particular network device. While such messaging is readily accomplished through the schema adaptation layer, it will sometimes prove simpler to employ such other messaging to notify potentially affected other network devices of such an event.

Network Data Model and Distributed Operation

This section will further describe the use of network devices of the types described above in a network employing a uniform data model and executing network policy applications in a distributed manner. In effecting the distributed operation and control of such a network, it proves advantageous to use a so-called Distributed Event Registration And Notification system (DERAN).

Figure 6:
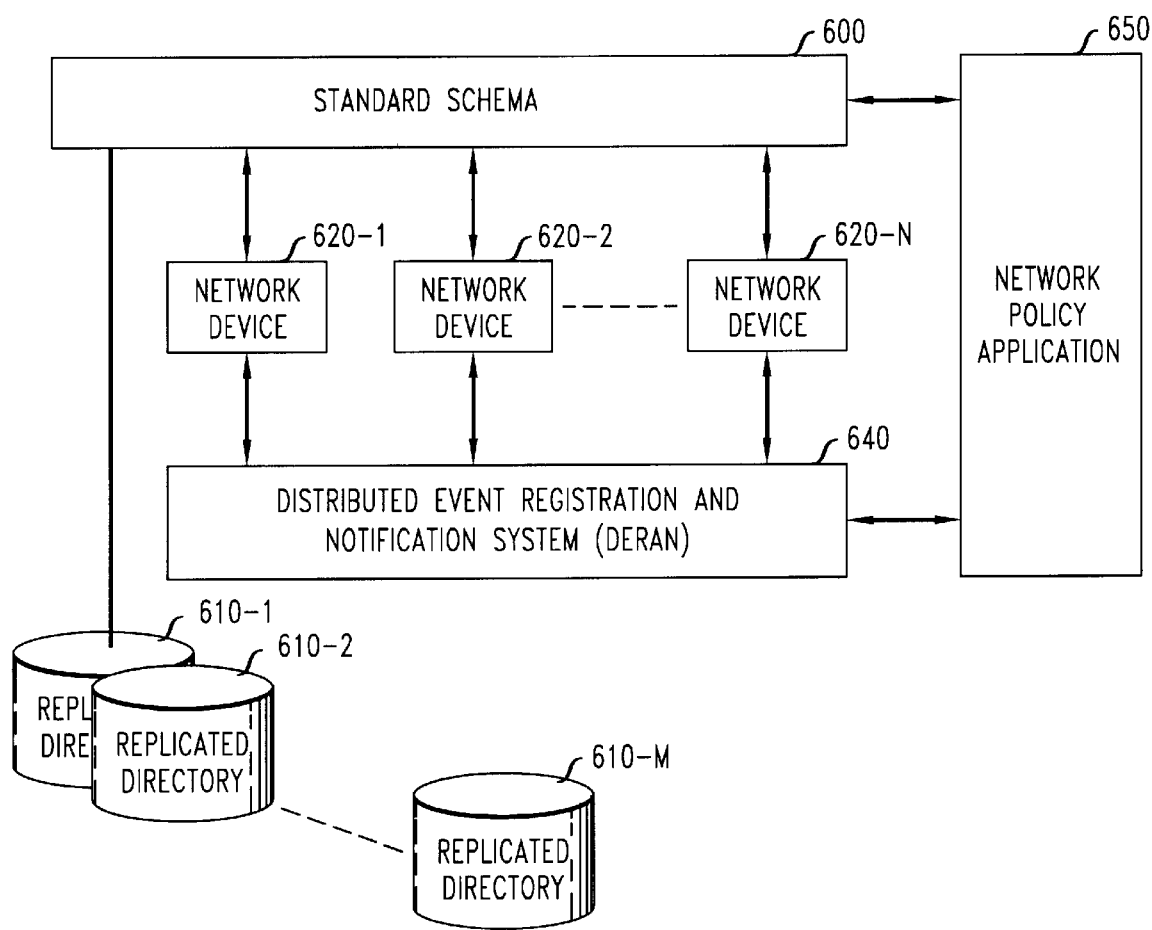
FIG. 6 shows an illustrative network employing a distributed data model and related event registration and distribution facilities cooperating with a network application in accordance one aspect of the present invention.

Thus, FIG. 6 shows an embodiment of the present invention incorporating a unified data model in use with a wide range of network devices. Shown there is replicated directory 610-i, i=1, 2, . . . , M selectively supplying directory information to a plurality of network devices 620-j, j=1, 2, . . . , N, through a standard schema interface 600. Though the standard schema interface 600 is shown as a separate entity in FIG. 6, it should be understood that the actual interface between standard data entities (directories, executable modules, or other data entities) and the network devices will be located at the devices themselves, thus providing a uniform access interface. Network devices 620-j shown in FIG. 6 illustratively are of the form shown in FIG. 5, but in FIG. 6 the schema layer is extracted to illustrate the uniformity of the data model and interface.

Network devices 620-j include a variety of traditional network devices—such as switches, access servers, VoIP servers, multi-media servers, routers, bridges, concentrators, hubs and the like-but, in addition, may include devices such as desktop, handheld and other portable, personal and office devices for information identification, retrieval, processing and display. Such network devices will, in appropriate cases, include terminal and/or browser functionality, and all of such devices are advantageously arranged to receive configuration and operational control information and executable modules in message form from one or more directories 610-i and/or others of the network devices shown in FIG. 6.

It will be appreciated that interconnection of devices in the arrangement of FIG. 6 is not limited to any predefined number, type or relationship-except that client-server relationships advantageously exist between or among at least some groupings of network devices, including directory or other databases. Rather, network devices in the network arrangement of FIG. 6 advantageously cooperate as required to perform network applications in a distributed manner. To emphasize the use of distributed network applications, illustrative network application 650 is shown in FIG. 5 to interface through schema interface 600 to the network devices 620-j. In operation, the network application 650 will execute in one or more of the network devices in the manner of policy application 550 in FIG. 5.

In the network arrangement of FIG. 6 it proves convenient to access all data, whether in standard directory format in replicated directories 610-i, in any other data centralized storage facility (database), or in one of the network devices 620-j, using one or more standard access protocols. In one illustrative embodiment of the inventive network of FIG. 6 it proves advantageous to use the well-known LDAP protocol, though other protocols, including those cited above, may be used in particular cases. When the LDAP protocol is used in a network of the type shown in FIG. 6, each network device 620-j advantageously comprises (i) an LDAP client module for obtaining required control and configuration information from other network devices 620, network databases, and directory servers such as distributed replicated directory servers 610-i, and (ii) an LDAP server module for supplying such information to these other network devices.

Figure 7:
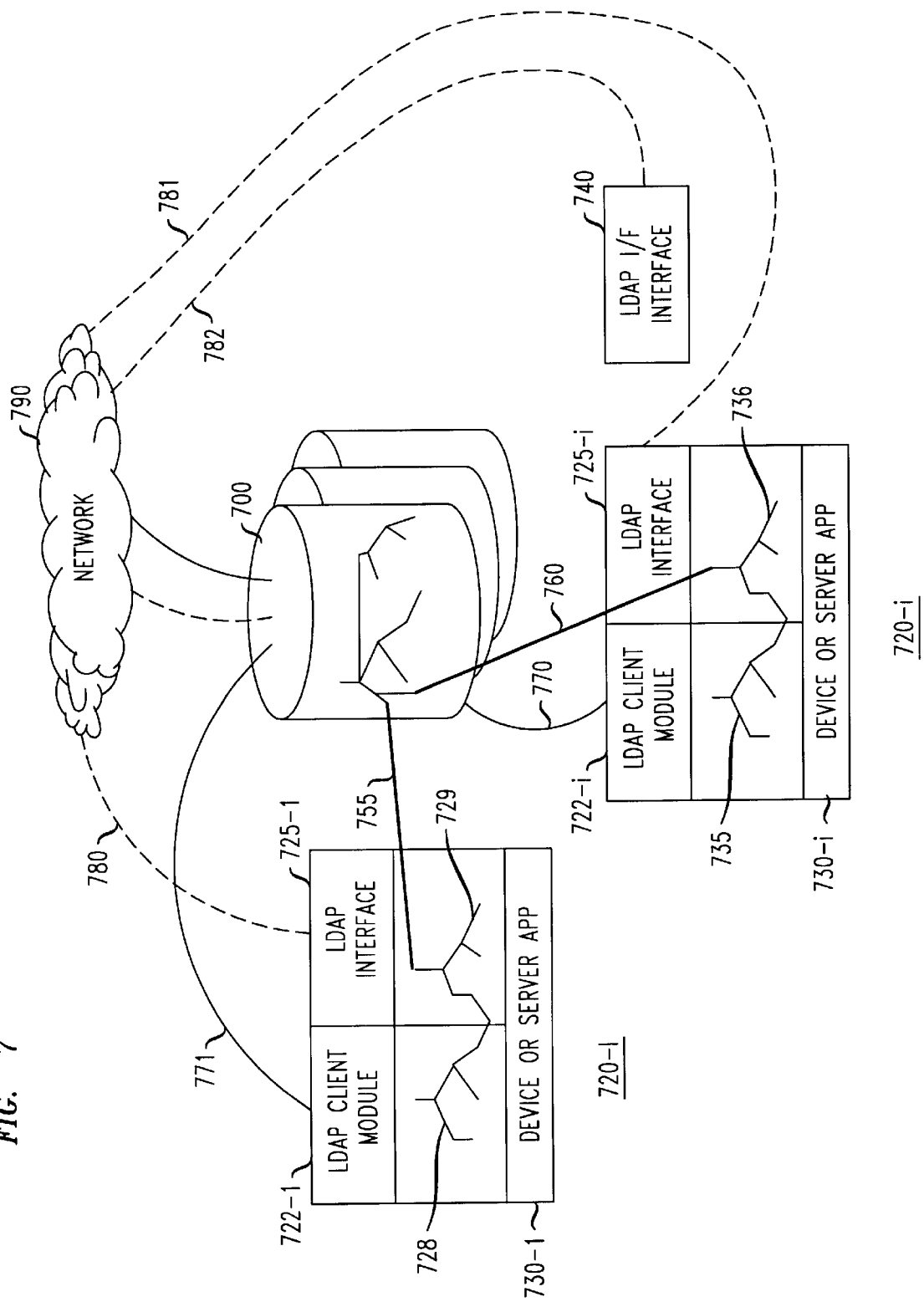
FIG. 7 shows an illustrative policy information storage and retrieval arrangement for use in the network of FIG. 6.

FIG. 7 shows a representation of exemplary directory structures maintained in replicated directory servers 700 and representative network devices 720-1 and 720-i. As will be appreciated by those skilled in the art, well-known directory organization is employed at directory servers 700 for characterizing the configuration and operation of network devices such as the representative devices 720-i, i=1, 2, . . ., N, in FIG. 7. LDAP client modules, such as client 722-i maintained at network device 720-i interact with replicated directory servers 700 to request and receive directory-structured information for particular network applications and uses, as in the system of FIG. 3. Representative directory trees 735 and 736 are shown at network device 720-i and corresponding (but, in general, different) directory trees are maintained at other network devices (such as that shown as device 720-1 in FIG. 7). Individual directory trees at each network device are advantageously logically attached (as shown by the representative heavy lines 760 and 755) to illustrative central directories maintained at replicated directory servers 700 in FIG. 7. In this manner the relationship of the (generally hierarchical) directory information stored centrally are readily maintained and updated as necessary using LDAP messaging. In particular, network managers can implement new policies by modifying the directory information stored centrally at directory servers 700 and permitting or requiring the selective transfer of this directory information to network devices requiring new information to effect the changed policies. As noted previously, information supplied to (or retrieved from) individual network devices need not be in directory form.

In an important departure from prior techniques, not all policy information need be stored at replicated directories 610-i shown in FIG. 6, or in the corresponding directories 700 in FIG. 7. Nor is it necessary that all policy application code be resident at, and exercise policy control from, a single or limited number of network nodes. Rather, individual policy information (and executable) modules are advantageously stored and, as appropriate, executed, at network devices throughout the network to improve overall network performance and efficiency.

Thus, for example, individual branches or entire sub-trees of directory information and executables at a network device such as 720-i may be accessed by other network devices through LDAP server interface 725-i. Such server interfaces interconnect network devices through access paths, e.g., broken line paths such as 780, 781 and 782 in FIG. 7, to provide information and executable modules through standard network messaging. Thus, client and server functions at individual network devices (such as LDAP server processor 530-(N−1) and client processor 530-N in FIG. 5) receive and send policy information (including executables) to other network devices 720 in FIG. 7. Network 790 in FIG. 7 may be a local area network (LAN) or a public or private wide area network (WAN), including the Internet. An important advantage of storing policy information and executables at individual network devices is that data or control functionality unique to a device or set of network devices can be stored at an optimal location in the network, rather than at, e.g., one or more of the replicated directory servers 610 or 700. Thus, policy information for particular network devices, or types of device, can be stored or executed at a representative one of these devices: the devices can rely on information or executables available at that representative device to generate updated control information for itself and any peer or colleague devices similarly affected by the policy change. This updated policy information available locally at one of these devices is advantageously provided to other affected network devices upon request or pushed under locally determined circumstances. Associations are conveniently established between information and executables available at particular network devices and those other network devices desiring or requiring such information or executables. These associations are advantageously established using the Distributed Event Registration and Notification (DERAN) system 640 shown in FIG. 6, as will be described in greater detail below. In general, network devices will rely on control or configuration information or executables from any number of other network devices. Moreover, the control or configuration information need not be in any directory-structured format; it may be differently structured or executable information.

It will be appreciated by those skilled in the art that when policy applets (or other executable policy modules) are transferred, whether from replicated directories 610-i or 700 in FIGS. 6 and 7, from other data sources, or from one or more other network devices 620, that processing of the executables at a receiving network device is illustratively accomplished using a policy interpreter and processor of the type shown in FIG. 3. Such policy executables received at a network device are typically used to modify device configuration or modify existing (or add new) device or server applications 730-i at a receiving network device such as 720-i in FIG. 7. It will be appreciated that network devices such as 620-i or 720-i will, in appropriate cases, include a plurality of network applications 730-i.

In accordance with an aspect of illustrative embodiments of the inventive network of FIG. 6, a wide range of distributed network applications can be accommodated. So, for example, existing network management tools from a variety of suppliers can operate in the distributed arrangement of FIG. 6, by suitable specification of information or executable modules operating through the uniform distributed data model access interface. As noted, coordination of the distributed resources of the network of FIG. 6 is facilitated using Distributed Event Registration and Notification (DERAN) facilities 640, as will be described next.

In accordance with another aspect of illustrative embodiments of the present invention, a uniform data model is advantageously employed throughout a network. As an example, the Common Information Model (CIM) cited above—as extended for particular contexts in accordance with the extensibility procedures given by the DMTF—will find application the illustrative systems of FIGS. 6 and 7. Moreover, in accordance with the distributed data model of the illustrative embodiments of the present invention shown there, individual network elements employs an internal data structure forming part of the overall illustrative CIM. In particular, it proves advantageous to have each network device "own," and have responsibility for maintaining, those components of the CIM that are best assigned to the respective network devices. Thus, for example, the operational state of a particular network device (reflecting such aspects as available capacity to handle additional traffic, congestion indications, priority schedules for particular data streams or any other operational condition) are typically stored and updated at that particular device. It proves useful, e.g., to consider a local network device data structure that reflects flow rates for data streams associated with a particular source, destination and network application.

While storing elements of a local data structure at a network device, it proves advantageous in accordance with present illustrative embodiments to make some or all of the data structure (including operational information) available to other network devices—illustratively using the above-noted LDAP protocol. Such availability is, of course, consistent with the organization of the illustrative network device of FIG. 5. This LDAP-base approach is conveniently used to access various parts of the local data structure, including the DERAN shown as 640 in FIG. 6. While DERAN 640 in FIG. 6 is shown as a separate logical element, it will be understood that it will typically be implemented using memory hardware (either separate from or part of the memory used for other purposes) and appropriate control software at each of the network devices.

Moreover, in accordance with an aspect of illustrative embodiments of the present invention, external network devices can register with the DERAN data structure maintained at a particular network device. Such registration by an external device advantageously includes one or more requests by the external device for notification by the particular device when the data structure at the particular network device assumes some operational state or condition (e.g., a change of specified magnitude). It proves convenient for a particular network device, such as 720-i in FIG. 7, to maintain a DERAN registration data structure for a broad range of operational state information that may be of interest to external network devices. In appropriate cases, such DERAN data structures will provide registration for all operational conditions in the operational data structures at the particular network device.

Table 1 shows an excerpt from an example DERAN registry. In particular, a network device identified as the owner (network device 720–1401) of a data element (JA-603) is seen to have (at least) two other network devices, 720–903 and 720–904, in registered associated with data element JA-603. The "association" of the other indicated devices with the data element JA-603 is typically established by messages between the owner network device and the associated network device(s), though such association may be established by direction from data stored at another network device (including a replicated directory server such as 610-i or 700). In some cases, the identification of the owner device may be implicit in the messaging or other addressing arrangements, rather than explicitly recited as in Table 1. While the registered entities are shown as other network devices, such registered entities can be network policy applications, as represented by an identified point of notice (which can be a network database, another network device, or a part of the data structure of such devices).

In any event, the association relationship typically reflects one or more states or conditions, such as exceeding a threshold for some network resource. In Table 1, an illustrative condition relating to assigned bandwidth at the owner network element is shown. In particular, associated device 720–903 is indicated as requesting notification when the owner network element has assigned at least 70% of its available bandwidth (typically for a specified port or source-destination-application combination). The actual value for the percent of the resource is illustratively shown as part of the response to the condition of which notification is requested. It will prove convenient in some cases to group states, conditions or other aspects of the data structures for which notification is to be taken. Thus an associated device may choose to be notified when one or more specified states or conditions are present (or some combination of such events); a single notification can be used to reflect a Boolean or other combination of events. Actual notification to a registered external device or application In addition, as shown in the example given in Table 1, the data element also has a further action to be taken upon a condition being satisfied. For example, if the condition is that indicated for associated device 720–903—the owner network device is experiencing a threshold percent of bandwidth (illustratively 70%) to be exceeded—then the data element itself is sent to device 720–903. Different thresholds (or other conditions) will generally be applicable to different policies, data elements, associated network devices and actions to be taken. If the data element JA-603 is a Java applet, then receipt of the data element at an associated device will make it available for execution at the receiving network device. Of course, the device or server application (as represented by 730-i in network device 720-i, for example) may have internal conditions which must be satisfied (or which are subject to schedule requirements).

TABLE 1

Example DERAN Registry

| OWNER DEVICE | DATA ELE-MENT | ASSOCIATED DEVICE | CONDITION | ACTION TO BE TAKEN |
|---|---|---|---|---|
| 720-1401 | JA-603 | 720-903 | >70% BW OCCUPANCY | SEND WITH BW % |
| 720-1401 | JA-603 | 720-904 | >80% BW OCCUPANCY | SEND WITH BW % |

If the data element JA-603 shown in Table 1 is not an executable module, it may nevertheless assume the form of a sub-tree or other directory structure as might, in prior network operation, be transferred from a replicated directory 610-i. It will be appreciated, therefore, that employing a standardized, distributed data model, with many or all network devices including facilities for storing directory information increases flexibility, imposes lesser demands on replicated directories, such as 610-i or 700, and reduces network interactions with non-involved network devices. It will be recognized that policy controls applicable only to one or more sub-networks or only particular types of network devices can be readily implemented using the above described distributed data model and linking of data elements. Further, the location and interaction of network devices are advantageously optimized (and network control traffic reduced) in comparison with use of a centralized directory server architecture.

It will be appreciated that the contents of the action-to-be-taken field for a particular data element or row in Table 1 may be a simple notification to the registered entity(ies) that the event occurred. In such cases, it may be preferred that the above-mentioned simple messaging link between the owner device and the (one or more) notified devices be used. That is, an LDAP link via the schema layer 520 may be avoided. Such simplified messaging may employ the other functional units in the network device, i.e., the device (a router, for example) will use normally available message origination and handling techniques to notify a registered entity.

The Distributed Data Model Access interface 600 of FIG. 6 is advantageously used in cooperation with the DERAN data structure described above to effect application of a policy application. The following is a further illustrative example of such cooperation in the context of network devices such as switches or routers having a plurality of input and output ports. The interconnection of respective input and output ports is typically specified in a table or list maintained in the device or elsewhere. An illustrative method of operation for a policy application in this context is then:

1. For each of the network devices in the list, select the interconnected ports. This operation will typically begin with a query of a central data repository (such as replicated directories 610-i or 700-i). However, because the data model used in the illustrative networks of FIGS. 6 and 7 is physically distributed, the application may receive responses from each network device in the list.

2. For each port, find the (usually similarly named) event registry entry associated with the port, and enter an appropriate change specification. As an example, the policy application registers for notification when the drop packet count on a given port exceeds a specified threshold. From the point of view of the policy application, the iteration occurs over a monolithic data structure, but since the data is physically distributed, the application illustratively makes entries in data structures stored in each network device in the list. Moreover, using the uniform distributed data model access interface 600 in FIG. 6, the application need not know the exact form of the data entry. That is, the interface 600 provides for any required mapping into the device-specific structures or the like.

In one example of such a mapping, an indication of queue length is sought by a querying application (in eight length categories, 0 through 7), but a particular queried device may only maintain queue lengths in two categories (e.g., greater than a threshold, T, or not). The uniform data model access interface 600 accordingly maps the query into appropriate two-level format and supplies an appropriate (e.g., category 2 or category 6 response, as appropriate). Other more comprehensive mappings will, of course, occur to those skilled in the art for particular devices and network requirements.

3. The network policy application then remains setup to receive event notification messages from network devices. The devices send notifications using addressing information that the policy application entered into the event registry entries. The associated device number shown in Table I is but one example of addressing information.

4. When the policy application receives a notification, it evaluates its origin and makes a query to receive the newly changed data value and any additional related information the policy application may need to affect policy. Additional data may include other data items for which the policy application has not registered, whether available at the network device providing the notification or otherwise. Since the example policy application under consideration is concerned with packet (drop) counts, illustratively for a specific source, destination, protocol and application, it may retrieve and inspect a number of items beyond those for which it is registered to receive notification.

5. If retrieved packet counts indicate that the policy is not fulfilled, the policy application typically performs some corrective action. For example, using the distributed data model, the policy application will advantageously alter the operational characteristics of upstream devices, e.g., re-routing specific traffic types around a congested device. Since operational parameters of routing services offered by individual network devices are also advantageously modeled in accordance with the CIM (or other agreed-upon data model), a policy application can readily adjust routing parameters as required to implement the desired policy.

6. If no event notification is received, or if remedial action is taken, a policy application, will typically continue monitoring inputs for relevant events. In general, any number of policy applications may be operational at the same time, advantageously with priority or over-ride relationships provided for potentially competing or conflicting policy applications. When network applications or other network conditions change, a different or additional policy application will monitor for events relevant to its sphere of operation.

Those skilled in the art will recognize that in a network that provides a distributed data access mechanism and distributed event registration and notification, even rapidly occurring events can be appropriately responded to. In particular, many otherwise difficult or impossible network adjustments involving relocation of all or part of a network policy application can be accomplished in applications of the present invention. Such relocation of application code becomes feasible when using a Java Virtual Machine (JVM) in accordance with the present inventive teachings.

Advantageously including a JVM in a network device as described above provides a policy author with a consistent computing platform. Though this alone does not insure a network policy application author with access to a consistent view of the network itself, uniform access to the distributed data model in accordance with the present inventive teachings extends control to the network itself Employing a distributed data model as described herein, the network itself can be consistently understood and affected from any point in the network. Just as the distributed data model enables data to be stored and maintained in the most efficient location, coupling of the JVM to the Distributed Data Model enables code to be executed at the most efficient location in the network. The present distributed data model enables data (and executables) that control and expresses the state of the network appear the same from any computing vantagepoint.

While some of the preceding description of illustrative embodiments refer to replicated directory servers, many networks and applications will not require replication of directory servers, especially if much of the data used to effect network policy are stored in network devices. In other embodiments, event tables may advantageously be replicated, especially for backup use between or among a group of similarly employed or related network devices. Thus, provision may be made for network device failure or unavailability. By replicating state information existing at one network device at a nearby or related network device, overall network reliability is enhanced, still without requiring centralized replicated directories such as 610-i or 700.

While the example excerpt from a DERAN data structure shown in Table 1 indicates device names in an arbitrary naming scheme, it will be recognized that network addresses, e.g., IP addresses will be used in appropriate cases. Further, though only one type of state, condition or other event is shown in the example of Table 1, it will be understood that increases, decreases, entry into (or departure from) a range, or any other logical expression reflecting such events may be employed. Other matters relating to notification, such as frequency, time since last notice, specific forms of acknowledgment or results of notification will likewise be provided for in appropriate cases.

Particular network applications, e.g., applications 730-i shown functioning at network device 730-i in FIG. 7 will advantageously provide the mechanism for notification. Thus, for example, upon each update of state information, including arrival or departure of data flows, a particular application will examine state information and identify any required notifications reflected in the DERAN data structure. Such data-aware applications are well known in the art. See, for example, Hyrkas, E., "Data-Driven Components," *Java Developer's Journal*, vol. 4, Issue 5, 1999, pp. 8–12.

As will be understood by those skilled in the networking arts, while well known Java virtual machine implementations may be used to process Java applets received at a network device, some implementations will find it convenient to employ special purpose Java processors. Such Java processors conveniently execute Java bytecode instructions directly in hardware, rather than in a software implementation of a JVM.

The network management approaches described above feature a Java-based policy-programming environment with external standards mirroring the internal standards. Employing standard device schemas in network databases and directories, as well as within devices themselves, provides an environment in which standards-aware applets need not know device specifics in order to manipulate the device.

The distributed data models, and the identification, access and use of data elements described above will be found increasingly useful in building intelligent networks. At one fundamental level intelligent networking depend upon correct and useful data derived from readily accessible databases. As industry standards are more widely implemented and adopted by corporate users and network service providers, ever increasing use of the described distributed data model and use of the inventive network programming model will permit the enlargement of network capabilities with enhanced flexibility and security.

Though illustrative LDAP protocol techniques have been discussed in connection with access and delivery of policy, status and configuration information it will be recognized that other particular protocols will be used as required for these and related purposes. Since data networks of the kinds described above include a variety of techniques for transferring executable modules, including Java applets, such modules may be transferred using any standard transfer techniques.

It will be understood that event notification techniques described above may be applied to internal interfaces and functional modules and entities at a network device, as well as to external network devices.

While certain of the illustrative data structures and data stores described above have been characterized as directory servers, replicated directories, or the like, it should be understood that stored data, whether distributed or centrally stored, used to effect network policies in accordance with illustrative inventive embodiments need have no particular directory or other structure beyond that selected to effect the desired control. Information in directory format will prove useful in many cases, but other applications of the present inventive embodiments will choose information otherwise structured.

Though the term "standard" has been used, e.g., in connection with various languages, protocols, interfaces, APIs and the like, it will be understood that the term will extend to generally accepted members of the respective classes, and to entities and practices open to or adopted by developers, manufacturers or users for a substantial number or range of contexts. Thus "standard" is to be contrasted with closed, "proprietary" or limited; in some cases, standard languages, protocols, schemas, etc. will be formally adopted by industry standards bodies, but no such adoption is necessary for use with the present invention.

What is claimed is:

1. In a data network having a plurality of selectively interconnected network devices, a method of operating a first network device comprising
   storing values for configuration attributes and state attributes for said first network device,
   associating function values for at least one function of selected state attribute values with at least one network policy application,
   selectively notifying at least one of said network policy applications of an event reflected by an associated function value, and
   receiving policy information through a standard input interface at said first network device from at least one network policy application.

2. The method of claim 1 wherein said configuration attributes comprise information used to influence the operation of said first device, said method further comprising selectively modifying said stored configuration attributes for said first network device in response to received policy information.

3. The method of claim 2 wherein said function of at least one selected state attribute assumes values representative of a set of conditions existing at said first network device, said values being relative to at least one preselected threshold value.

4. The method of claim 3 wherein said set of conditions represents at least one level of network traffic at said first device.

5. The method of claim 1 wherein said associating comprises storing information in a registry, said information identifying
   said function values for said at least one function of selected state attribute values, and
   said at least one network policy application.

6. The method of claim 1 wherein said at least one network policy application executes at at least one network device external to said first network device.

7. The method of claim 5 further comprising
   receiving messages from other network devices, which messages comprise information identifying additional network devices to be associated with respective ones of said function values, and wherein
   said associating comprises adding said additional network devices to said registry in association with said respective function values.

8. The method of claim 1 wherein said selectively notifying comprises sending messages through a standard output interface at said first network device.

9. The method of claim 1 wherein said selectively notifying comprises sending messages using means for sending non-policy network messages.

10. The method of claim 1 wherein said receiving policy information through a standard input interface comprises
    presenting a uniform API to received policy information, and
    converting received policy information to control information for controlling operation of said first network device.

11. The method of claim 10 wherein said control information comprises updated configuration attribute values, and said method further comprises means for updating said stored configuration attribute values.

12. The method of claim 1 wherein said policy information received through said standard interface comprises structured data values.

13. The method of claim 12 wherein said structured data values comprise at least one directory.

14. The method of claim 13 wherein said at least one directory comprises a plurality of hierarchical directories.

15. The method of claim 12 wherein said policy information comprises at least one executable policy module.

16. The method of claim 1 wherein said policy information received through said standard interface comprises at least one executable policy module and said method further comprises executing at least one of said received policy modules.

17. The method of claim 1 wherein said policy information received through said standard interface comprises at least one Java applet.

18. The method of claim 1 wherein said receiving policy information through a standard input interface comprises
  recognizing the one of a known plurality of protocols employed to send policy information to said first network device,
  converting policy information received using said one of said plurality of protocols into control information specific to said first network device, and
  modifying said configuration attributes in response to said control information.

19. The method of claim 1 wherein said function values for at least one function of selected state attribute values comprise said state attribute values for said selected attribute values.

20. In a data network having a plurality of selectively interconnected network devices, a first network device comprising
  means for storing values for configuration attributes and state attributes for said first network device,
  means for associating function values for at least one function of selected state attribute values with at least one network policy application,
  means for selectively notifying at least one of said network policy applications of an event reflected by an associated function value, and
  means for receiving policy information through a standard input interface at said first network device from at least one network policy application.

21. The network device of claim 20 wherein said configuration attributes comprise information used to influence the operation of said first device, said first network device further comprising means responsive to received policy information for selectively modifying said stored configuration attributes for said first network device.

22. The network device of claim 20 wherein said state attributes each comprise information representing the state of a selected set of conditions existing at said first device.

23. The network device of claim 20 wherein said function of at least one selected state attribute assumes values representative of said set of conditions relative to at least one preselected threshold value.

24. The network device of claim 23 wherein said set of conditions represents at least one level of network traffic at said first device.

25. The network device of claim 20 wherein said means for associating comprises a registry storing information identifying
  said function values for said at least one function of selected state attribute values, and
  said at least one network policy application.

26. The network device of claim 20 wherein said at least one network policy application executes at at least one network device external to said first network device.

27. The network device of claim 25 further comprising
  means for receiving messages from other network devices, which messages comprise information identifying additional network devices to be associated with respective ones of said function values, and wherein said means for associating comprises means for adding said additional network devices to said registry in association with said respective function values.

28. The network device of claim 20 wherein said means for selectively notifying comprises means for sending messages through a standard output interface at said first network device.

29. The network device of claim 20 wherein said means for selectively notifying comprises means for sending messages using means for sending non-policy network message traffic to other network devices.

30. The network device of claim 20 said standard input interface comprises a standard schema comprising
  means for presenting a uniform API to received policy information, and
  means for converting received policy information to control information for controlling operation of said first network device.

31. The network device of claim 30 wherein said control information comprises updated configuration attribute values, and said network device comprises means for updating said stored configuration attribute values.

32. The network device of claim 20 wherein said policy information received through said standard interface comprises structured data values.

33. The network device of claim 32 wherein said structured data value comprises at least one directory.

34. The network device of claim 33 wherein said at least one directory comprises a plurality of hierarchical directories.

35. The network device of claim 32 wherein said policy information comprises at least one executable policy module.

36. The network device of claim 20 further comprising means at said first network device for executing received policy modules, and wherein said policy information received through said standard interface comprises at least one executable policy module.

37. The network device of claim 20 further comprising a Java Virtual Machine (JVM) at said first network device, and wherein said policy information received through said standard interface comprises at least one Java applet.

38. The network device of claim 20 wherein said means for receiving policy information through a standard input interface comprises
  means for recognizing the one of a known plurality of protocols employed to send policy information to said first network device,
  means for converting policy information received using said one of said plurality of protocols into control information specific to said first network device, and
  means for modifying said configuration attributes in response to said control information.

39. The network device of claim 20 wherein said function values for at least one function of selected state attribute values comprise said state attribute values for said selected attribute values.

40. A uniform distributed network data model for use at a plurality of network devices interconnected in a network, the network data model at a first network device comprising
  device-specific configuration attribute values corresponding to said first network device, state attribute values corresponding to the state of said first network device, registry information relating selected ones of said state attribute values to network policy applications executing in said network, selected portions of said registry information being available through a uniform data interface to related respective ones of said policy applications, each of said configuration attribute values for said first network device being susceptible of change in response to information received at said first network device from at least one of said network policy applications.

41. The network data model of claim 40 wherein each of said configuration attribute values for said particular network device is susceptible of change in response to execution of executable code received in information from said at least one of said policy applications.

42. The network data model of claim 41 wherein said executable code received comprises Java applets executable at said first network device.

43. A method for enabling a network comprising a plurality of network devices to operate in accordance with at least one network policy application the method comprising storing at each of said plurality of network devices device-specific configuration attribute values corresponding to the respective one of said network devices, each of said configuration attribute values for a particular network device being susceptible of change in response to messages received at said particular network device from at least one of said network policy applications, state attribute values corresponding to the state of the respective one of said network devices, registry information relating said state attribute values to at least one of said network policy applications, said state attribute values being available for access by respective ones of said network policy applications to which said state attribute values are related, receiving through a standard input interface from at least one of said network policy applications policy information for updating said device specific configuration information.

44. The method of claim 43 further comprising sending a notification to said at least one network policy application of events occurring at at least one of said network policy applications.

* * * * *